3,105,089
ANGELIC ACID ESTERS
Solomon Morris Kupchan, Madison, Wis., assignor to Wisconsin Alumni Research Foundation, Madison, Wis., a corporation of Wisconsin
No Drawing. Filed Dec. 7, 1959, Ser. No. 857,499
7 Claims. (Cl. 260—486)

The present invention relates to the preparation of angelate esters and resulting products.

In investigations in this field attempts to prepare angelate esters by the more or less standard procedure involving the use of the acid chloride prepared from angelic acid resulted in the formation of the isomeric tiglate esters. Attempts to avoid isomerization (which could occur during the preparation of the acid chloride or during esterification, or both) proved unsuccessful. With continued investigation it was then discovered that isomerization did not take place and that the desired angelate esters could be readily prepared by carrying out the esterification with a 3-haloangeloyl halide, such as 3-bromoangeloyl chloride, followed by hydrogenolysis of the resulting 3-haloangelate ester to remove the halogen atom.

The following examples will serve to illustrate the invention.

EXAMPLE I

3-Bromoangeloyl Chloride

To 2.8 g. of phosphorous trichloride at room temperature was added in small lots 4.7 g. of 3-bromoangelic acid. The reaction mixture was heated on a water bath at 60–65° C. for 2.5 hours. The upper (slightly yellow) layer was decanted from the syrupy lower layer and distilled under reduced pressure. The desired chloride had a B.P. 75° C. at 30 mm. The halogen atom in the 3-position can be chlorine and the acid halide can be bromide.

EXAMPLE II (l)-Menthyl Angelate

To a solution of 1.55 g. of (l)-menthol in 5 ml. of dry benzene was added 2.1 g. of 3-bromoangeloyl chloride. The reaction mixture was heated under reflux on a steam bath until evolution of hydrochloric acid fumes ceased and then the solvent was removed by distillation. The residue on distillation at reduced pressure yielded (l)-menthyl-(3-bromoangelate), B.P. 108° C. at 0.4 mm.

To a suspension of 0.75 g. of 10% palladium on carbon in 100 ml. of 95% ethanol, which had previously been saturated with hydrogen, was added a solution of 1.5 g. of (l)-menthyl-(3-bromoangelate) and 1.6 g. of anhydrous sodium acetate in 50 ml. of 95% ethanol. After hydrogenation at atmospheric pressure for 26 minutes, the theoretical uptake of one mole equivalent of hydrogen was complete and the hydrogenation was terminated. The catalyst was removed by filtration and the filtrate was fractionally distilled to remove most of the ethanol. The residue was made alkaline with a 10% sodium carbonate solution, extracted with chloroform, the chloroform extracts were dried over sodium sulfate and distilled at steam bath temperature to leave a residue which on distillation at reduced pressure yielded (l)-menthyl angelate, B.P. 130° C. at 9 mm.

Other angelate esters can be prepared in a similar manner by reacting the haloangeloyl halide (chloride or bromide) with various alcohols such as:

(1) Methyl alcohol to give methyl bromoangelate
(2) Ethyl alcohol to give ethyl bromoangelate
(3) Geraniol to give geranyl bromoangelate
(4) (d)-Citronellol to give (d)-citronellyl bromoangelate
(5) Farnesol to give farnesyl bromoangelate
(6) Phenylethyl alcohol to give phenylethyl bromoangelate which upon hydrogenolysis yield, respectively:

(1) Methyl angelate
(2) Ethyl angelate
(3) Geranyl angelate
(4) (d)-Citronellyl angelate
(5) Farnesyl angelate
(6) Phenylethyl angelate The angelate esters of the type noted above and especially the R-angelates, where R represents a hydrocarbon group having 8–15 carbon atoms, have characteristic aromatic odors and can be used in various fields and particularly in the perfumery field in accordance with standard practices in this art.

EXAMPLE III

Germine 3-Angelate 15-(l)-2'-Methylbutyrate

To a solution of germine 15-(l)-2'-methylbutyrate (0.365 g.) in pyridine (5 ml.) was added with stirring, 3-bromoangeloyl chloride (0.135 g.) at room temperature. The reaction mixture was allowed to stand for 24 hours at room temperature. The mixture was then treated with crushed ice, made alkaline with 10% sodium carbonate solution, and extracted with chloroform. The reaction products from two such batches were combined (0.92 g.) and chromatographed on acid-washed alumina (16 g.). Elution with benzene (250 ml.) yielded an amorphous product with a high $R_f$. Elution with 50% benzene-chloroform (500 cc.) followed by chloroform (870 cc.) yielded germine 3-(3'-bromoangelate) 15-(l)-2'-methylbutyrate as a pale yellow amorphous material, ($[\alpha]_D+16°$) (c. 1.05, ethanol).

To a suspension of 10% palladium on carbon (0.07 g.) in 95% ethanol (10 ml.) which had previously been saturated with hydrogen, was added a solution of the bromoangelate (0.14 g.) in ethanol (4 ml.) containing anhydrous sodium acetate (0.07 g.). After hydrogenation at atmospheric pressure for three minutes the theoretical uptake of one mole equivalent of hydrogen was complete and the hydrogenation was terminated. The catalyst was removed by filtration, washed with ethanol (15 ml.) and the filtrate was evaporated under reduced pressure. The residue was suspended in water (5 ml.), made alkaline (pH 8) with a 10% sodium carbonate solution and extracted several times with chloroform. The chloroform extract was dried over anhydrous sodium sulfate. Evaporation under reduced pressure yielded germine 3-angelate 15-(l)-2'methylbutyrate which was crystallized from acetone-water as colorless flat needles (115 mg.), M.P. 220–221° C. dec. The melting point was not depressed on admixture with an authentic sample of germanidine.

EXAMPLE IV

Protoverine 3-Angelate 6,7-Diacetate 15-(l)-2'-Methylbutyrate

Protoveratrine B is converted by periodate oxidation followed by alkaline hydrolysis to protoverine 6,7-diacetate 15-(l)-2'-methylbutyrate as described in the copending application of S. Morris Kupchan, Serial No. 857,498, filed December 7, 1959, now U.S. Patent No. 3,009,917, and this product then converted to protoverine 3-3'-bromoangelate 6,7-diacetate 15-(l)-2'-methylbutyrate by reaction with 3-bromoangeloyl chloride as described in the copending application of S. Morris Kupchan, Serial No. 857,484, filed December 7, 1959, now abandoned.

The amorphous 3-3'-bromoangelate (67 mg.) prepared as described above was dissolved in 95% ethanol (6 cc.) containing sodium acetate (45 mg.) and added to a suspension of 10% palladium on charcoal (35 mg. in 95% ethanol (4 cc.) that had previously been saturated with hydrogen. After two minutes the theoretical uptake of hydrogen was consumed and the hydrogenation was terminated. The catalyst was removed by filtration and the filtrate was acidified with glacial acetic acid and was evaporated nearly to dryness. The residue was dissolved in water, basified with dilute ammonia and extracted with chloroform. The chloroform solution was dried over anhydrous sodium sulfate and evaporated to yield a resin which was crystallized from acetone-water to give colorless plates, M.P. 235–236° C. dec. The melting point was not depressed on admixture with an authentic sample of escholerine.

The angelate esters of Examples III and IV have insecticidal properties and can be used to kill house flies in concentrations of about 0.01–1.0% by weight in standard insecticide carriers such as dusts, kerosene, etc. as described in the copending Kupchan application Serial No. 857,484, filed December 7, 1959, now abandoned.

I claim:

1. The product R-angelate, where R is an unsaturated aliphatic hydrocarbon selected from the group consisting of geranyl, (d)-citronellyl and farnesyl.
2. Geranyl angelate.
3. (d)-Citronellyl angelate.
4. Farnesyl angelate.
5. In the process of making esters of angelic acid by the reaction of the acid chloride, angeloyl chloride, with an esterifying alcohol selected from the group consisting of methyl, ethyl, geraniol, (d)-citronellol, farnesol, menthol and phenylethyl alcohols, the improvement which consists in using the acid chloride, 3-bromoangeloyl chloride, and then removing the bromine atom from the resulting 3-bromoangelate ester by hydrogenolysis.
6. In the process of making germine 3-angelate 15-(l)-2'-methylbutyrate, the steps which consist in reacting germine 15-(l)-2'-methylbutyrate with 3-bromoangeloyl chloride and then removing the bromine atom from the resulting bromoangelate ester by hydrogenolysis.
7. In the process of making protoverine 3-angelate 6,7-diacetate 15-(l)-2'-methylbutyrate, the steps which consist in reacting protoverine 6,7-diacetate 15-(l)-2'-methylbutyrate with 3-bromoangeloyl chloride and then removing the bromine atom from the resulting bromoangelate ester by hydrogenolysis.

References Cited in the file of this patent

Plisov et al.: Chemical Abstracts, September 1958, vol. 52, 14528–14529.